United States Patent
Li et al.

(10) Patent No.: US 6,802,302 B1
(45) Date of Patent: Oct. 12, 2004

(54) SYSTEM FOR DIAGNOSING EGR FLOW RATE OPERATION

(75) Inventors: Xiaoqiu Li, Columbus, IN (US); Mark R. Stepper, Columbus, IN (US); Stephanie L. Goerges, Franklin, IN (US); Yue Yun Wang, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 10/409,307

(22) Filed: Apr. 8, 2003

(51) Int. Cl.$^7$ .............................................. F02M 25/07
(52) U.S. Cl. ...................... 123/568.16; 123/568.21; 701/108; 73/117.3; 73/118.2
(58) Field of Search ................ 123/568.11, 568.12, 123/568.16, 568.21, 568.22, 568.23, 568.24, 568.25, 568.26, 568.27; 701/108; 73/117.3, 118.1, 118.2; 60/605.2

(56) References Cited

U.S. PATENT DOCUMENTS

| | | | | |
|---|---|---|---|---|
| 4,142,493 A | * | 3/1979 | Schira et al. | 123/568.21 |
| 5,465,617 A | * | 11/1995 | Dudek et al. | 73/118.2 |
| 5,921,223 A | | 7/1999 | Fukuma | 123/568.21 |
| 5,921,224 A | | 7/1999 | Sinnamon | 123/568.21 |
| 5,934,249 A | | 8/1999 | Nanba et al. | 123/350 |
| 6,019,094 A | | 2/2000 | Itoyama | 123/676 |
| 6,035,640 A | | 3/2000 | Kolmanovsky et al. | 60/605.2 |
| 6,076,502 A | | 6/2000 | Katashiba et al. | 123/435 |
| 6,098,602 A | | 8/2000 | Martin et al. | 123/568.23 |
| 6,112,729 A | | 9/2000 | Barnes et al. | 123/568.21 |
| 6,128,902 A | * | 10/2000 | Kolmanovsky et al. | 60/605.2 |
| 6,178,373 B1 | | 1/2001 | Davis et al. | 701/104 |
| 6,227,182 B1 | | 5/2001 | Muraki et al. | 123/568.21 |
| 6,230,697 B1 | | 5/2001 | Itoyama et al. | 123/568.21 |
| 6,293,267 B1 | | 9/2001 | Smith et al. | 123/568.22 |
| 6,363,922 B1 | | 4/2002 | Romzek et al. | 123/568.16 |
| 6,367,462 B1 | | 4/2002 | McKay et al. | 123/568.21 |
| 6,378,515 B1 | | 4/2002 | Geyer | 123/683 |
| 6,390,077 B1 | * | 5/2002 | Simpson et al. | 123/568.16 |
| 6,401,700 B2 | | 6/2002 | Balekai et al. | 123/568.12 |
| 6,408,834 B1 | * | 6/2002 | Brackney et al. | 123/568.21 |
| 6,415,776 B1 | | 7/2002 | Gates et al. | 123/568.24 |
| 6,428,242 B1 | | 8/2002 | Ward | 405/220 |
| 6,467,469 B2 | * | 10/2002 | Yang et al. | 123/568.21 |
| 6,480,782 B2 | * | 11/2002 | Brackney et al. | 701/108 |
| 6,705,301 B2 | * | 3/2004 | Dollmeyer et al. | 123/568.22 |
| 2002/0103593 A1 | * | 8/2002 | Brackney et al. | 701/108 |

* cited by examiner

Primary Examiner—Willis R. Wolfe, Jr.
(74) Attorney, Agent, or Firm—Barnes & Thornburg

(57) ABSTRACT

A system is disclosed for diagnosing EGR flow rate operation in an internal combustion engine includes an intake manifold and an exhaust manifold coupled to the engine and an EGR conduit for recirculating exhaust gas from the exhaust manifold to the intake manifold. Means are provided for determining an EGR fraction corresponding to a fractional amount of recirculated exhaust gas in a total air charge supplied to the intake manifold. A control computer is configured to continually accumulate at least one EGR fraction error sum as a function of the EGR fraction and a desired EGR fraction, and to diagnose EGR flow rate operation as a function of the accumulated value of the at least one EGR fraction error sum.

42 Claims, 4 Drawing Sheets

SYSTEM FOR DIAGNOSING EGR FLOW RATE OPERATION

FIELD OF THE INVENTION

The present invention relates generally to systems for monitoring the flow rate of recirculated exhaust gas in an exhaust gas recirculation (EGR) system of an internal combustion engine, and more specifically to systems for diagnosing faults or failure conditions associated with EGR flow rate operation.

BACKGROUND OF THE INVENTION

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to selectively introduce (i.e., recirculate) exhaust gas from the exhaust manifold into the fresh air stream flowing to the intake manifold via a controllable EGR valve. Through the use of an on-board microprocessor, control of the EGR valve is typically accomplished as a function of information supplied by a number of engine operational sensors.

It is desirable to monitor EGR flow rate operation to insure that the actual EGR fraction tracks the desired or commanded EGR fraction with a specified accuracy. What is therefore needed is a system for monitoring EGR flow rate operation and diagnosing EGR flow rate faults or failure conditions as they may occur.

SUMMARY OF THE INVENTION

The present invention may comprise one or more of the following features and combinations thereof. A system for diagnosing exhaust gas recirculation (EGR) flow rate operation in an internal combustion engine may comprise intake and exhaust manifolds each operatively coupled to the engine, and an EGR conduit for recirculating exhaust gas from the exhaust manifold to the intake manifold. Means are provided for determining an EGR fraction corresponding to a fractional amount of recirculated exhaust gas in a total air charge supplied to the intake manifold, and a control computer is configured to continually accumulate at least one EGR fraction error sum as a function of the EGR fraction and a desired EGR fraction, and to diagnose EGR flow rate operation as a function of the accumulated value of the at least one EGR fraction error sum.

The control computer may be configured to diagnose the EGR flow rate operation as failing if the accumulated value of the at least one EGR fraction error sum meets or exceeds one of a first and a second threshold value during a diagnostic period. The control computer may be configured to set the EGR flow rate diagnostic flag to FAIL upon diagnosing the EGR flow rate operation as failing.

The control computer may further be configured to diagnose the EGR flow rate operation as normal if the accumulated value of the at least one EGR fraction error sum remains less than the one of the first and second threshold value during the diagnostic period and is less than one of a third and fourth threshold value upon expiration of the diagnostic period. The system may further include a memory having an EGR flow rate diagnostic flag stored therein, wherein the control computer is configured to set the EGR flow rate diagnostic flag to PASS upon diagnosing the EGR flow rate operation as normal.

The control computer may further be configured to set the EGR flow rate diagnostic flag to ABORT if the accumulated value of the at least one EGR fraction error sum remains less than the one of the first and second threshold value during the diagnostic period but meets or exceeds the one of a third and fourth threshold value upon expiration of the diagnostic period.

The control computer may be configured to continually compute for the diagnostic period an EGR fraction error as a difference between the EGR fraction and the desired EGR fraction, a positive EGR fraction error sum as a maximum of zero and a sum of a previous value of the positive EGR fraction error sum and the EGR fraction error, and a negative EGR fraction error sum as a maximum of zero and a sum of a previous value of the negative EGR fraction error sum and the EGR fraction error.

In this embodiment, the control computer may be configured to diagnose the EGR flow rate operation as failing if either of the accumulated value of the positive EGR fraction error sum meets or exceeds the first threshold value during the diagnostic period and the accumulated value of the negative EGR fraction error sum meets or exceeds the second threshold value during the diagnostic period.

The control computer may further be configured in this embodiment to diagnose the EGR flow rate operation as normal if the accumulated value of the positive EGR fraction error sum remains less than the first threshold value throughout the diagnostic period and the accumulated value of the negative EGR fraction error sum remains less than the second threshold value throughout the diagnostic period, and if the positive EGR fraction error sum is less than a third threshold value, less than the first threshold value, and the negative EGR fraction error sum is less than a fourth threshold value, less than the second threshold value, upon expiration of the diagnostic period.

The control computer may further be configured in this embodiment to set the EGR flow rate diagnostic flag to ABORT if the accumulated value of the positive EGR fraction error sum remains less than the first threshold value throughout the diagnostic period and the accumulated value of the negative EGR fraction error sum remains less than the second threshold value throughout the diagnostic period, and if the positive EGR fraction error sum meets or exceeds the third threshold value and the negative EGR fraction error sum meets or exceeds the fourth threshold value, upon expiration of the diagnostic period.

The control computer may further be configured to monitor a number of diagnostic enable conditions prior to starting the diagnostic period, and to start the diagnostic period only if all of the number of diagnostic enable conditions are met.

The control computer may further be configured to monitor the number of diagnostic enable conditions throughout the diagnostic period, and to restart the diagnostic period if any of the number of diagnostic enable conditions is no longer met.

The system may include means for determining rotational speed of the engine, and one of the number of diagnostic enable conditions may correspond to the rotational speed of the engine being within a predefined range of engine rotational speeds.

The control computer may further be configured to determine an engine load value as a function of an engine fueling command, and one of the number of diagnostic enable conditions may correspond to the engine load value being less than a threshold engine load value.

The system may further include an EGR valve disposed in-line with the EGR conduit, wherein the EGR valve is responsive to an EGR valve control command to control a position of the EGR valve relative to a reference position, and means for determining the position of the EGR valve relative to the reference position. One of the number of diagnostic enable conditions may correspond to the position of the EGR valve being greater than a threshold EGR valve position.

The system may further be configured to monitor a number of data acquisition conditions prior to during the diagnostic period, and to compute the EGR fraction error, the positive EGR fraction error sum, and the negative EGR fraction error sum only if all of the number of data acquisition conditions are met.

These and other objects of the present invention will become more apparent from the following description of the illustrative embodiments.

DESCRIPTION OF THE ILLUSTRATIVE EMBODIMENTS

Figure 1:
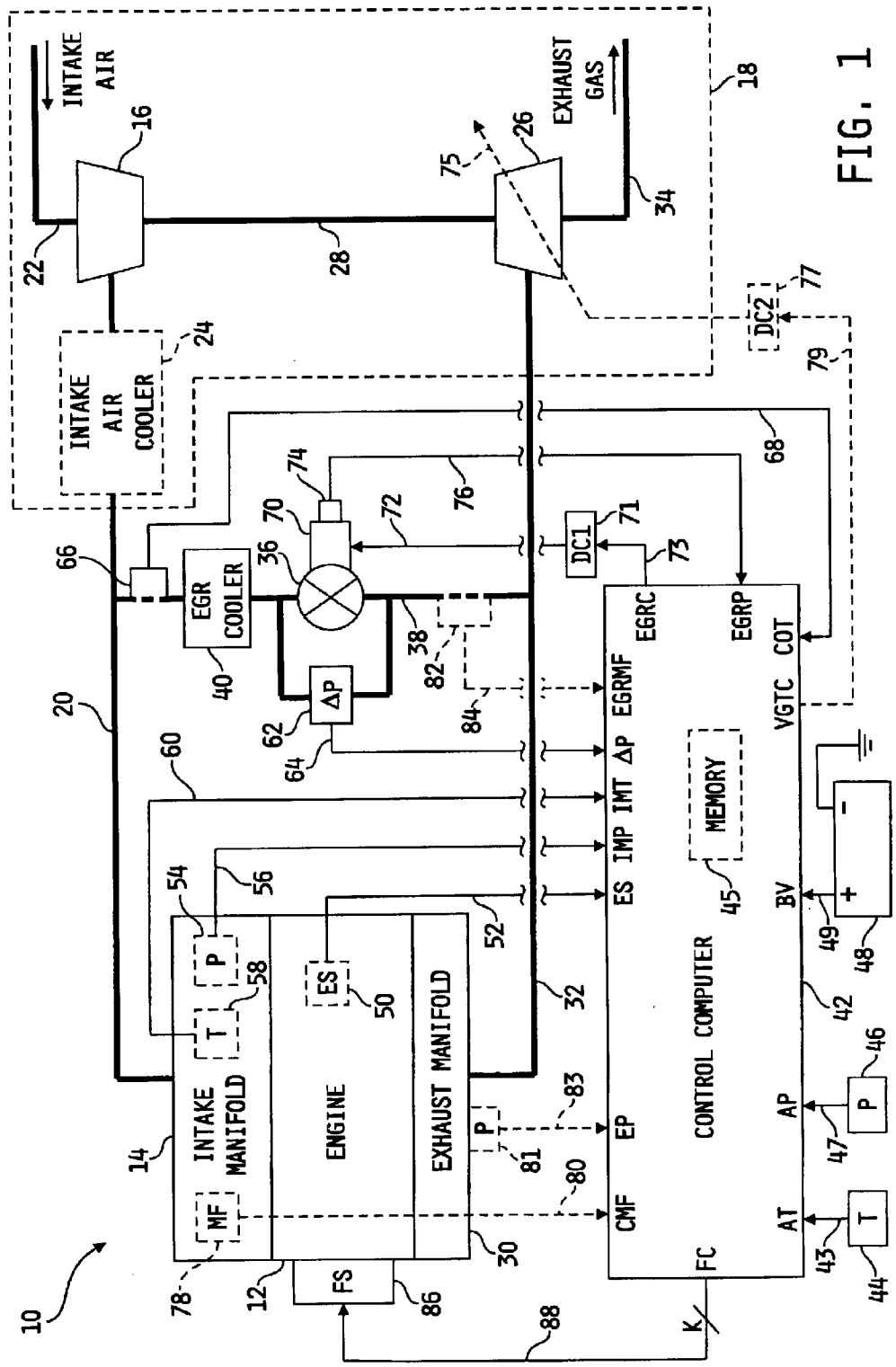
FIG. 1 is a diagram of one illustrative embodiment of a system for diagnosing EGR flow rate operation.

For the purpose of promoting an understanding of the principles of the invention, reference will now be made to one or more embodiments illustrated in the drawings and specific language will be used to describe the same. It will nevertheless be understood that no limitation of the scope of the invention is thereby intended.

Referring now to FIG. 1, a diagram of one illustrative embodiment of a system 10 for diagnosing EGR flow rate operation in an internal combustion engine is shown. System 10 includes an internal combustion engine 12 having an intake manifold 14 fluidly coupled to an intake conduit 20, and an exhaust manifold 30 fluidly coupled to an exhaust conduit 32. System 10 may further include a turbocharger as shown surrounded by a dash-lined perimeter 18 in FIG. 1. In embodiments of system 10 including turbocharger 18, a turbocharger compressor 16 includes a compressor inlet coupled to an intake conduit 22 for receiving fresh ambient air therefrom, and a compressor outlet fluidly coupled to intake conduit 20. Optionally, as shown in phantom in FIG. 1, system 10 may include an intake air cooler 24 of known construction disposed in-line with intake conduit 20 between the turbocharger compressor 16 and the intake manifold 14. The turbocharger compressor 16 is mechanically coupled to a turbocharger turbine 26 via a drive shaft 28, wherein turbine 26 includes a turbine inlet fluidly coupled to exhaust conduit 32 and a turbine outlet fluidly coupled to ambient via an exhaust conduit 34.

In any case, an exhaust gas recirculation system comprising part of system 10 includes an EGR valve 36 disposed in-line with an EGR conduit 38 fluidly connected between exhaust conduit 32 and intake conduit 20. An EGR outlet of the EGR valve 36 is fluidly coupled via conduit 38 to an inlet of an EGR cooler 40 having an outlet fluidly coupled to the intake conduit 20 via EGR conduit 38. The EGR cooler is configured in a known manner to cool recirculated exhaust gas flowing therethrough. The EGR valve is of known construction and is electronically controllable to selectively control the flow of recirculated exhaust gas therethrough to the intake manifold 14.

System 10 includes a control computer 42 that is generally operable to control and manage the overall operation of engine 12. Control computer 42 includes a memory unit 45 as well as a number of inputs and outputs for interfacing with various sensors and systems coupled to engine 12. Control computer 42 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 42 includes one or more control algorithms, as will be described in greater detail hereinafter, for diagnosing EGR flow rate operation.

Control computer 42 includes a number of inputs for receiving signals from various sensors or sensing systems associated with system 10. For example, system 10 includes a suitably located ambient air temperature sensor 44 electrically connected to an ambient temperature input, AT, of control computer 42 via signal path 43. Ambient temperature sensor 44 may be of known construction, and is operable to produce a temperature signal on signal path 43 indicative of the temperature of ambient air. System 10 further includes a suitably located ambient air pressure sensor 46 electrically connected to an ambient pressure input, AP, of control computer 42 via signal path 47. Ambient pressure sensor 46 may be of known construction, and is operable to produce a pressure signal on signal path 47 indicative of the pressure of ambient air.

System 10 further includes a vehicle battery 48 producing a battery voltage, BV, that is supplied to a battery voltage input, BV, of control computer 42 via signal path 49. The vehicle battery 48 may be of conventional construction and configured to produce a nominal battery voltage, BV, of approximately 12 volts, although battery 48 may alternatively be configured to produce the battery voltage, BV, anywhere in the range of approximately 7–24 volts.

System 10 further includes an engine speed sensor 50 electrically connected to an engine speed input, ES, of control computer 42 via signal path 52. Engine speed sensor 50 is operable to sense rotational speed of the engine 12 and produce an engine speed signal on signal path 52 indicative of engine rotational speed. In one embodiment, sensor 50 is a Hall effect sensor operable to determine engine speed by sensing passage thereby of a number of equi-angularly spaced teeth formed on a gear or tone wheel. Alternatively, engine speed sensor 50 may be any other known sensor operable as just described including, but not limited to, a variable reluctance sensor or the like.

System 10 further includes an intake manifold pressure sensor 54 disposed in fluid communication with intake manifold 14 and electrically connected to an intake manifold pressure input, IMP, of control computer 42 via signal path 56. Alternatively, pressure sensor 54 may be disposed in fluid communication with intake conduit 20. In any case, pressure sensor 54 may be of known construction, and is operable to produce a pressure signal on signal path 56 indicative of the pressure within intake conduit 20 and intake manifold 14.

System 10 further includes an intake manifold temperature sensor 58 disposed in fluid communication with the intake manifold 14 of engine 12, and electrically connected to an intake manifold temperature input, IMT, of control computer 42 via signal path 60. Intake manifold temperature sensor 58 may be of known construction, and is operable to produce a temperature signal on signal path 60 indicative of the temperature of air charge flowing into the intake manifold 14, wherein the air charge flowing into the intake manifold 14 is generally made up of fresh air supplied by the turbocharger compressor 16 combined with recirculated exhaust gas that is controllably routed through EGR valve 36.

System 10 further includes a differential pressure sensor, or ΔP sensor, 62 having one inlet fluidly coupled to EGR conduit 38 upstream of the EGR valve 36 and an opposite inlet fluidly connected to EGR conduit 38 downstream of EGR valve 36. Alternatively, the ΔP sensor 62 may be coupled across another flow restriction mechanism disposed in-line with EGR conduit 38. In any case, the ΔP sensor 62 may be of known construction and is electrically connected to a ΔP input of control computer 42 via signal path 64. The ΔP sensor 62 is operable to provide a differential pressure signal on signal path 64 indicative of the pressure differential across EGR valve 36 or other flow restriction mechanism as just described.

System 10 further includes an EGR cooler outlet temperature sensor 66 disposed in fluid communication with EGR conduit 38 adjacent to the EGR cooler outlet orifice and electrically connected to an EGR cooler outlet temperature input, COT, of control computer 42 via signal path 68. EGR cooler outlet temperature sensor 66 may be of known construction, and is operable to produce a temperature signal on signal path 68 indicative of the temperature of exhaust gas exiting the exhaust gas outlet orifice of the EGR cooler 40. Alternatively, the temperature sensor 66 may be located elsewhere along EGR conduit 38 at a location suitable for detecting the temperature of exhaust gas exiting the exhaust gas outlet orifice of the EGR cooler 40.

Optionally, as shown in phantom in FIG. 1, system 10 may further include a first mass air flow sensor 78 disposed in fluid communication with intake manifold 14, or alternatively with intake conduit 20 downstream of the junction of intake conduit 20 with the EGR conduit 38, and in any case electrically connected to a charge mass flow rate input, CMF, of control computer 42 via signal path 80. Mass air flow sensor 78 may be of known construction, and is operable to produce a mass air flow signal on signal path 80 indicative of the mass flow rate of air charge entering intake manifold 14, wherein the term "air charge" for purposes of this document will be understood to be a combination of fresh air and recirculated exhaust gas.

System 10 may further optionally include a second mass air flow sensor 82, as shown in phantom in FIG. 1, disposed in fluid communication with EGR conduit 38 and electrically connected to an EGR mass flow rate input, EGRMF, of control computer 42 via signal path 84. Although sensor 82 is illustrated in FIG. 1 as being positioned in fluid communication with EGR conduit 38 near the junction of EGR conduit 38 and exhaust conduit 32, it will be understood that sensor 82 may alternatively be positioned in fluid communication with EGR conduit 38 anywhere along its length. In any case, mass air flow sensor 82 may be of known construction, and is operable to produce a mass air flow signal on signal path 84 indicative of the mass flow rate of recirculated exhaust gas flowing through EGR conduit 38.

System 10 may further optionally include a pressure sensor 81, as shown in phantom in FIG. 1, disposed in fluid communication with the exhaust manifold 30 and electrically connected to an exhaust pressure input, EP, of control computer 42 via signal path 83. Alternatively, pressure sensor 54 may be disposed in fluid communication with the exhaust conduit 32 upstream of the junction of exhaust conduit 32 and EGR conduit 38. In any case, pressure sensor 81 may be of known construction, and is operable to produce a pressure signal on signal path 83 indicative of exhaust gas pressure within exhaust manifold 30 and exhaust conduit 32.

Control computer 42 also includes a number of outputs for controlling one or more engine functions associated with system 10. For example, EGR valve 36 includes an EGR valve actuator 70 electrically connected to an output of a first actuator drive circuit 71 via signal path 72, wherein the first actuator drive circuit 71 has an input electrically connected to an EGR valve control output, EGRC, of control computer 42 via signal path 73. The first actuator drive circuit 71 is responsive to an EGR valve control signal produced by control computer 42 on signal path 72 to produce a corresponding EGR valve actuator drive signal, and actuator 70 is responsive to the EGR valve actuator drive signal to control the position of EGR valve 36 relative to a reference position in a known manner. Control computer 42 is accordingly operable to control EGR valve 36 in a known manner to selectively provide a flow of recirculated exhaust gas from exhaust manifold 30 to intake manifold 14. EGR valve 36 further includes an EGR position sensor 74 electrically connected to an EGR valve position input, EGRP, of control computer 42 via signal path 76. Sensor 74 may be of known construction and is operable to determine a position of EGR valve 36 by determining a position of EGR valve actuator 70 relative to a reference actuator or position, and producing a position signal on signal path 76 indicative of the position of EGR valve 36 relative to a reference position.

System 10 may further include a variable geometry turbocharger mechanism, illustrated in phantom by reference number 75. The variable geometry turbocharger (VGT) mechanism may be or include any known mechanism operable to control the swallowing capacity and/or efficiency of the turbocharger 18, and examples of such mechanisms include, but are not limited to, any one or combination of a turbocharger actuator responsive to an actuator drive signal to selectively control the internal geometry of the turbocharger turbine 26, a wastegate valve and actuator assembly responsive to an actuator drive signal to selectively divert exhaust gas flow around turbine 26, an exhaust throttle and actuator assembly responsive to an actuator drive signal to selectively control the cross-sectional flow area of exhaust conduit 32 and/or exhaust conduit 34, or the like. In any case, a second actuator drive circuit 77 has an output that produces the actuator drive signal, and an input electrically connected to a variable geometry turbocharger control output, VGTC, of control computer 42 via signal path 79. The second actuator drive circuit 77 is responsive to the variable geometry turbocharger control signal produced by control computer 42 on signal path 79 to produce one or more actuator drive signals, and any one or more of the VGT actuators may be responsive to corresponding ones of the actuator drive signals to control the position of an associated VGT mechanism actuator relative to a reference position in a known manner. Control computer 42 is accordingly operable to any such VGT mechanism in a known manner to selectively control the swallowing capacity and/or efficiency of the turbocharger 18.

System 10 further includes a fuel system 86 electrically connected to a fuel command output, FC, of control computer 42 via a number, K, of signal paths 88 wherein K may be any positive integer. Fuel system 86 is responsive to the fueling commands, FC, produced by control computer 42 to supply fuel to engine 12 in a known manner.

Figure 2:
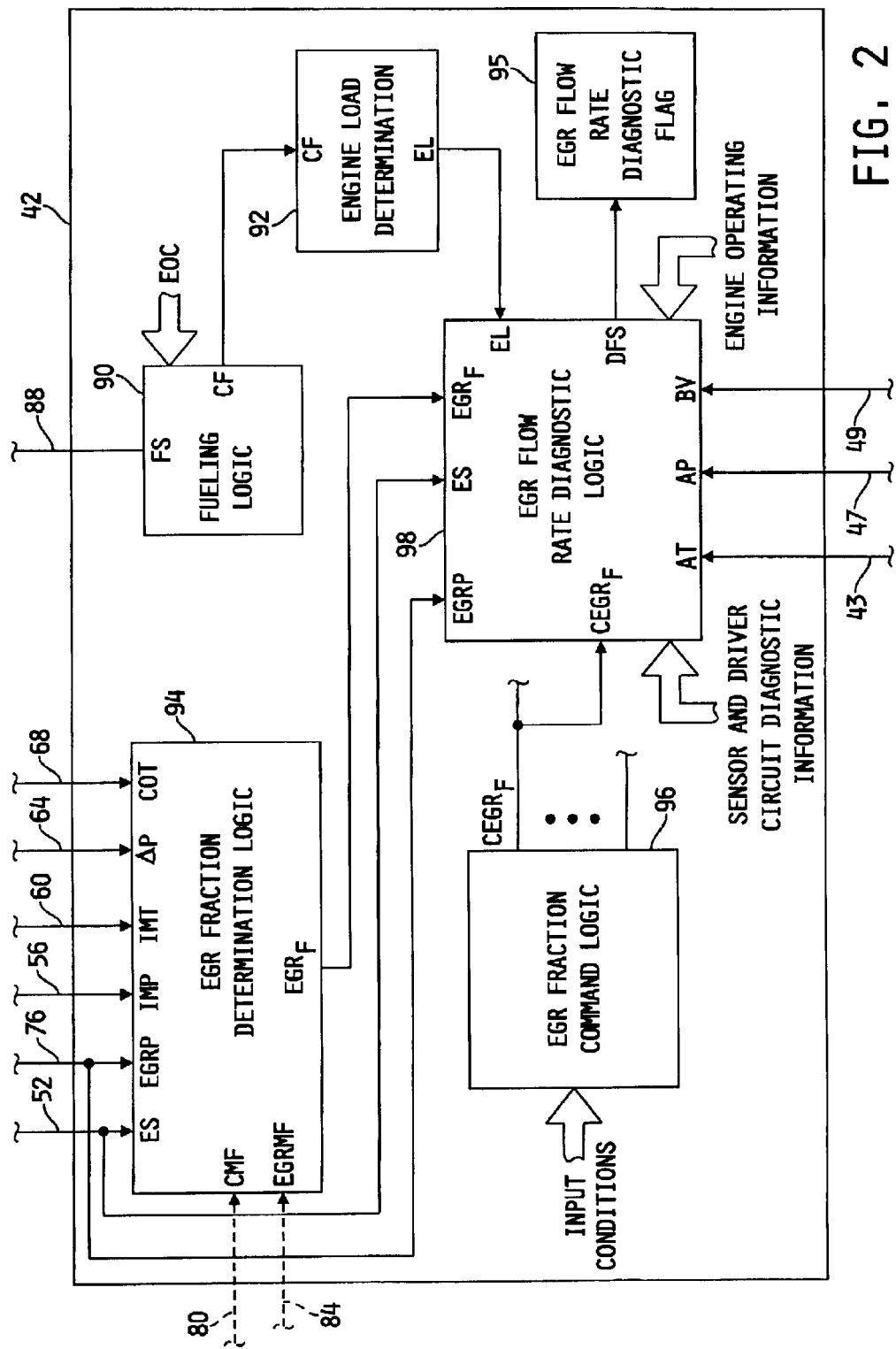
FIG. 2 is a block diagram of one illustrative configuration of some of the internal features of the control computer of FIG. 1 as they relate to diagnosing EGR flow rate operation.

Referring now to FIG. 2, a block diagram of one illustrative configuration of some of the internal features of the control computer 42 of FIG. 1, as they relate to diagnosing EGR flow rate operation, is shown. Control computer 42 includes a fueling logic block 90 receiving as inputs a number of engine operating condition values, EOC, including, for example, engine speed and other engine operating parameters. Block 90 is responsive to the number of engine operating condition values, EOC, to determine a number of fueling parameters including a commanded fueling value, CF, as a function of these various fueling parameters, in a manner well known in the art. Block 90 is further operable in a known manner to process the commanded fueling value, CF, and produce therefrom the fueling command, FC, provided on signal path 88 to the fueling system 86. The fueling system 86 is responsive to the fueling command, FC, to supply fuel to engine 12 as described hereinabove.

Control computer 42 further includes an engine load determination block 92 receiving the commanded fueling value, CF, from the fueling logic block 90. Block 92 is responsive to the commanded fueling value, CF, to determine an engine load value, EL, in a conventional manner. In one embodiment, for example, block 92 is operable to compute the engine load value, EL, as a ratio of CF and the difference between a "full-load" fueling value and a "no-load" fueling value, wherein the "full-load" and "no-load" fueling values are typically calibratible values stored in memory 45. Those skilled in the art will recognize that block 92 may alternatively be configured to compute the engine load value, EL, according to other known functions of commanded fueling, CF, and/or other engine operating conditions, and any other such alternate configuration of block 92 is intended to fall within the scope of the claims appended hereto. In any case, the engine load value, EL, is generally a parameter that is indicative of the amount of work being done by the engine 12.

Control computer 42 further includes an EGR fraction determination logic block 94 having an engine speed input, ES, receiving the engine speed signal on signal path 52, an EGR valve position input, EGRP, receiving the EGR valve position signal on signal path 76, an intake manifold pressure input, IMP, receiving the intake manifold pressure signal on signal path 56, an intake manifold temperature input, IMT, receiving the intake manifold temperature signal on signal path 60, a delta pressure input, ΔP, receiving the delta pressure signal on signal path 64, and an EGR cooler outlet temperature input, COT, receiving the EGR cooler outlet temperature signal on signal path 68. In embodiments of system 10 including mass air flow sensor 78, block 94 may receive as an input the charge mass flow rate signal on signal path 80, and in embodiments of system 10 including mass air flow sensor 82, block 94 may receive as an input the EGR mass flow rate signal on signal path 84. In any case, the EGR fraction determination logic block 94 is operable to determine, as will be described in greater detail hereinafter, an EGR fraction value, $EGR_F$, and to provide this value at an EGR fraction output, $EGR_F$ of block 94, wherein $EGR_F$ corresponds to the fractional amount of recirculated exhaust gas comprising the total charge; i.e., combination of fresh air and recirculated exhaust gas, provided to intake manifold 14.

Control computer 42 further includes an EGR fraction command logic block 96 producing a commanded EGR fraction value, $CEGR_F$, corresponding to a desired EGR fraction amount or value, as a function of one or more input conditions. Logic block 96 may additionally be configured to produce other command values, as illustrated in phantom in FIG. 2. In one embodiment, logic block 96 is configured to produce the commanded EGR fraction value, $CEGR_F$, as a function of ambient air temperature, engine speed and coolant temperature, and details relating to a specific embodiment of such a logic block are provided in co-pending U.S. patent application Ser. No. 10/059,619, entitled SYSTEM FOR PRODUCING CHARGE FLOW AND EGR FRACTION COMMANDS BASED ON ENGINE OPERATING CONDITIONS, which is assigned to the assignee of the present invention, and the disclosure of which is incorporated herein by reference. Alternatively, the EGR fraction command logic block 96 may be configured to produce at least the commanded EGR fraction value, $CEGR_F$, in a known manner as a function of one or more engine and/or air handling system operating conditions.

Control computer 42 further includes an EGR flow rate diagnostic logic block 98 having an EGR fraction input, $EGR_F$, receiving the EGR fraction value from EGR fraction determination logic block 94, an engine speed input, ES, receiving the engine speed signal on signal path 52, an EGR valve position input, EGRP, receiving the EGR valve position signal on signal path 76, a commanded EGR fraction input, $CEGR_F$ receiving the commanded EGR fraction value from the EGR fraction command logic block 96, an ambient temperature input, AT, receiving the ambient temperature signal on signal path 43, an ambient pressure input receiving the ambient pressure signal on signal path 45, and a battery voltage input, BV, receiving the battery voltage on signal path 49. Block 98 further receives information generated internally to control computer 42 in a known manner, wherein such information includes sensor and driver circuit diagnostic information and certain engine operating information, as will be described in greater detail hereinafter. Block 98 is operable to diagnose EGR flow rate operation and produce an EGR flow rate diagnostic flag value at a diagnostic flag status output, DFS, corresponding to the diagnostic outcome of the EGR flow rate diagnostic operation, and details relating to such diagnostic operation will be described in greater detail hereinafter with reference to FIGS. 3A–3B. Memory 45 includes a flag storage location 95 maintaining a current value of the EGR flow rate diagnostic flag.

The EGR fraction determination logic block 94 is operable to determine the EGR fraction value, $EGR_F$, as a function of current engine operating conditions. In one embodiment, block 94 is configured to first estimate values of EGR flow rate, EGRF, and charge flow rate, CF, and then compute the EGR fraction value, $EGR_F$, as a function of the estimated EGRF and CF values. Alternatively, system 10 may include both mass flow sensors 78 and 82, and control computer 42 may be configured in this embodiment to determine the EGR fraction value, $EGR_F$, as a ratio of the charge mass flow and EGR mass flow information obtained directly from sensors 78 and 82.

In embodiments of block 94 configured to estimate the EGR flow rate, EGRF, control computer 42 may be configured to estimate EGRF as a function of the pressure differential value, $\Delta P$, the intake manifold pressure, IMP, the EGR cooler outlet temperature, COT, and an effective flow area, EFA, corresponding to the cross-sectional flow area defined through EGR conduit 38. Block 94 is configured, in one specific embodiment, to compute the effective flow area value, EFA, as a function of the EGR valve position signal, EGRP. In this embodiment, block 94 may include one or more equations, graphs and/or tables relating EGR position values, EGRP, to effective flow area values, EFA. Alternatively, block 94 may be configured to determine the effective flow are value, EFA, according to known techniques. In any case, block 94 is operable to estimate the EGR flow value, EGRF according to the equation:

$$EGRF=EFA*sqrt[|(2*\Delta P*IMP)/(R*COT)|] \qquad (1),$$

where,

EFA is the effective flow area through EGR conduit 38, $\Delta P$ is the pressure differential across EGR valve 36, IMP is the intake manifold pressure, R is a known gas constant (e.g., R=53.3 ft-lbf/lbm ° R or R=287 J/Kg ° K), and COT is the EGR cooler outlet temperature.

Alternatively, block 94 may be additionally configured to determine an exhaust gas temperature value, corresponding to the temperature of exhaust gas produced by engine 12, and to substitute the exhaust gas temperature value for the EGR cooler outlet temperature value in equation (1). In one embodiment, for example, block 94 may be configured to estimate the exhaust gas temperature as a function of a number of engine operating conditions, and details relating to one such configuration of block 94 are described in U.S. Pat. No. 6,428,242, entitled SYSTEM FOR ESTIMATING ENGINE EXHAUST TEMPERATURE, which is assigned to the assignee of the present invention, and the disclosure of which is incorporated herein by reference. Those skilled in the art will recognize that the exhaust gas temperature value may alternatively be computed according to other known exhaust gas temperature estimation techniques. Alternatively, system 10 may include an exhaust gas temperature sensor (not shown) and control computer 42 may be configured in a known manner to determine exhaust gas temperature information directly from information provided by such a sensor. Any such alternate mechanisms and/or techniques for determining the exhaust gas temperature value are intended to fall within the scope of the claims appended hereto.

In any case, further details relating the foregoing EGR flow rate estimation technique, as well as other suitable EGR flow rate estimation techniques, are described in co-pending U.S. patent application Ser. No. 09/774,897, entitled SYSTEM AND METHOD FOR ESTIMATING EGR MASS FLOW AND EGR FRACTION, which is assigned to the assignee of the present invention, and the disclosure of which is incorporated herein by reference. Those skilled in the art will recognize that other known techniques may be used to estimate or otherwise determine the EGR flow rate value, EGRF. For example, system 10 may include a CO or $CO_2$ sensor of known construction and fluidly coupled to intake manifold 14 or intake conduit 20 downstream of the junction of intake conduit 20 with the EGR conduit 38. Such a CO or $CO_2$ sensor will be operable to produce a signal indicative of CO or $CO_2$ level of air charge entering the intake manifold 14, and such information may be used to determine the EGR flow rate value, EGRF, using known equations. As another example, system 10 may include mass flow rate sensor 82, and control computer 42 may be configured in such an embodiment to receive the EGR mass flow rate information directly from sensor 82, in which case the EGR flow rate estimation technique just described may be omitted from block 94. As yet another example, the control computer 42 may include other EGR flow rate estimation algorithms, such as one or more the algorithms described in the above-referenced document, wherein control computer 42 may be operable to estimate the EGR flow rate according to one or more such alternative EGR flow rate estimation strategies. Any and all such alternative EGR flow rate determination techniques and strategies are intended to fall within the scope of the claims appended hereto.

The EGR fraction determination logic block 94 is, in one embodiment, further configured to estimate the charge flow value, CF, by first estimating the volumetric efficiency ($\eta_v$) of the charge intake system, and then computing CF as a function of $\eta_v$ using a conventional speed/density equation. Any known technique for estimating $\eta_v$ may be used, and in one preferred embodiment of block 142, $\eta_v$ is computed according to a known Taylor mach number-based volumetric efficiency equation given as:

$$\eta_v=A_1*\{(Bore/D)^2*(stroke*ES)^B/sqrt(\gamma*R*IMT)*[(1+EP/IMP)+A_2]\}+A_3 \qquad (2),$$

where,

A1, $A_2$, $A_3$ and B are all calibratible parameters fit to the volumetric efficiency equation based on mapped engine data, Bore is the intake valve bore length, D is the intake valve diameter, stroke is the piston stroke length, wherein Bore, D and stroke are dependent upon engine geometry, $\gamma$ and R are known constants (e.g., $\gamma*R$=387.414 J/kg/deg K), ES is engine speed, IMP is the intake manifold pressure, EP is the exhaust pressure, where EP=IMP+$\Delta P$, and IMT=intake manifold temperature.

With the volumetric efficiency value $\eta_v$ estimated according to the foregoing equation, block 94 is configured to compute the charge flow value, CF, according to the equation:

$$CF=\eta_v*V_{DIS}*ES*IMP/(2*R*IMT) \qquad (3),$$

where, $\eta_v$ is the estimated volumetric efficiency, $V_{DIS}$ is engine displacement and is generally dependent upon engine geometry, ES is engine speed, IMP is the intake manifold pressure, R is a known gas constant (e.g., R=53.3 ft-lbf/lbm ° R or R=287 J/Kg ° K), and IMT is the intake manifold temperature.

Those skilled in the art will recognize that the charge flow value, CF, may alternatively be computed or otherwise determined according to other known techniques. For example, system 10 may optionally include mass flow sensor 78 and control computer 42 may be configured in a known manner to determine charge flow values directly from information provided by such sensor 78. As another example, control computer 42 may be configured to estimate the charge flow value, CF, according to one or more known charge flow estimation techniques. Any such alternate mechanisms and/or techniques for determining the charge flow value, CF, are intended to fall within the scope of the claims appended hereto.

In any case, with the EGR flow rate, EGRF, and charge flow rate, CF, determined according to any of the foregoing techniques, the EGR fraction determination logic block 94 is configured to compute the EGR fraction value, $EGR_F$, as a ratio of CF and EGRF; i.e., EGRFR=CF/EGRF. It is to be understood that equation (1), as well as the computation of the EGR fraction value, EGRFR, just described represent simplified approximations of these two parameters based on assumptions of constant exhaust gas temperature through the EGR valve 36 and steady state flow of exhaust gas through EGR valve 36, and neglecting effects resulting from variable time delays between the passage of recirculated exhaust gas through EGR valve 36 and arrival of the corresponding EGR fraction in the engine cylinders. Further details relating to strategies for addressing such assumptions are described in co-pending U.S. patent application Ser. No. 09/774,897, entitled SYSTEM AND METHOD FOR ESTIMATING EGR MASS FLOW AND EGR FRACTION, which is assigned to the assignee of the present invention, and the disclosure of which has been incorporated herein by reference. The EGR fraction value, $EGR_F$, determined in accordance with any one or more of the techniques just described, is provided to the EGR fraction input, $EGR_F$, of the EGR flow rate diagnostic logic block 98. Block 98 is configured to diagnose EGR flow rate operation as a function of the commanded EGR fraction value, $CEGR_F$, and of the measured or estimated EGR fraction value, $EGR_F$, and to control the status of the EGR flow rate diagnostic flag stored in memory location 95 based on the diagnosis.

Figure 3A:
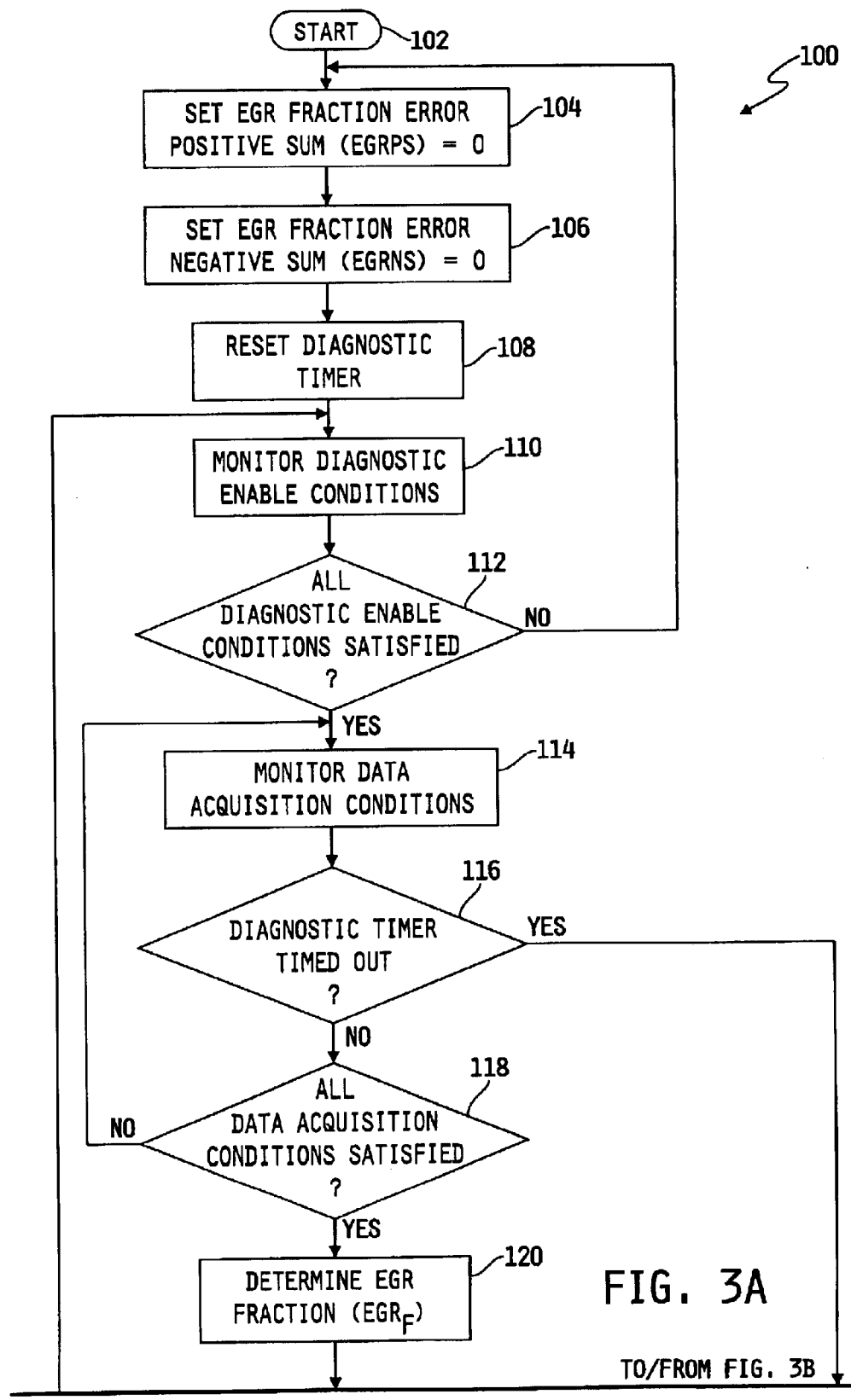
FIGS. 3A and 3B represent a flowchart of one illustrative embodiment of a software algorithm for diagnosing EGR flow rate operation using the system illustrated in FIGS. 1 and 2.
Figure 3B:
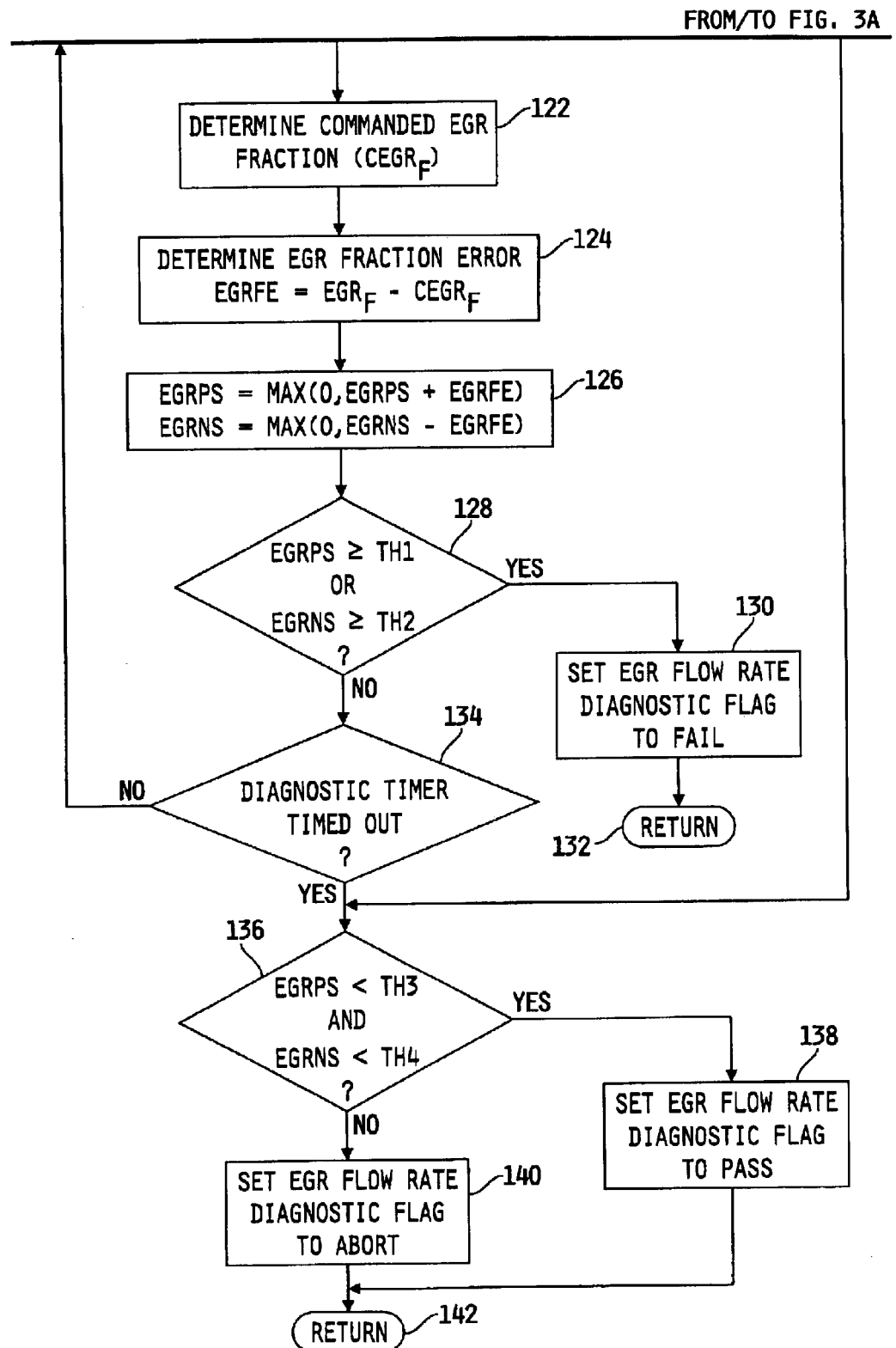

Referring now to FIGS. 3A and 3B, a flowchart is shown illustrating one embodiment of a software algorithm 100 for diagnosing EGR flow rate using the system illustrated in FIGS. 1 and 2. In one embodiment, algorithm 100 is stored within memory 45, and is in any case executed by control computer 42. Algorithm 100 begins at step 102, and thereafter at step 104 control computer 42 is operable to set a positive EGR fraction error sum value, EGRPS, equal to zero or to some other predefined constant value. Following step 104, control computer 42 is operable at step 106 to set a negative EGR fraction error sum value, EGRNS, equal to zero or to some other predefined constant value, and thereafter at step 108 to reset a diagnostic timer.

Following step 108, algorithm execution advances to step 110 to begin a diagnostic period wherein control computer 42 is operable to monitor a number of EGR flow rate diagnostic enable conditions. Thereafter at step 112, control computer 42 is operable to determine whether all EGR flow rate diagnostic enable conditions are satisfied. In one embodiment, control computer 42 is operable to execute step 110 by monitoring the engine operating conditions set forth in the following Table 1, and comparing these various engine operating conditions to corresponding parameter thresholds or ranges also set forth in Table 1. If all of these enabling conditions are satisfied, algorithm execution advances to step 114, and otherwise it loops back to step 104.

TABLE 1

| Engine Operating Parameter | Enabling Threshold or Range |
|---|---|
| EGR Valve Position | $EGRP > EGRP_{TH}$ |
| Engine Load (EL) | $EL < EL_{TH}$ |
| Engine speed (ES) | $ES_L < ES < ES_H$ |

In Table 1, the EGR valve position, EGRP, must be greater than a threshold 1o EGR valve position, $EGRP_{TH}$, to enable the EGR flow rate diagnostic operation. It is desirable to set $EGRP_{TH}$ at a value that ensures some amount of recirculated exhaust gas has been commanded that results in a detectable level of EGR flow and fraction, and in one embodiment $EGRP_{TH}$ corresponds to a 10% open EGR valve, although other threshold EGR valve positions are contemplated. The engine load, EL, determined by block 92 must further be less than an engine load threshold, $EL_{TH}$. It is desirable to set $EL_{TH}$ at a level that is less than full load, yet high enough to ensure that some amount of recirculated exhaust gas has been commanded, and in one embodiment $EL_{TH}$ is 95% although other engine load threshold values are contemplated. As yet a further EGR flow rate diagnostic enabling condition, the engine speed, ES, must be in a range between a low engine speed, $ES_L$, and a high engine speed, $ES_H$. It is desirable that, $ES_L$ and $ES_H$ define an engine speed range indicative of the engine operating at a level that results in some amount of commanded EGR flow, and in one embodiment $ES_L$ is set at 1000 RPM and $ES_H$ is set at 2800 RPM, although other engine speed ranges are contemplated.

Those skilled in the art will recognize that Table 1 represents only one illustrative collection of EGR flow rate diagnostic enabling conditions, and that this collection may alternatively exclude some of the listed conditions and/or include other engine and/or system operating condition that are not listed in Table 1. Any such alternate collection of enabling conditions will typically be dictated by the application and/or desired accuracy of the diagnostic algorithm, and is in any case intended to fall within the scope of the claims appended hereto.

Referring again to FIG. 3A, if control computer 42 determines at step 112 that all of the diagnostic enable conditions have been satisfied, algorithm execution advances to step 114 where control computer 42 is operable to monitor a number of data acquisition conditions. Thereafter at step 116, control computer 42 is operable to determine whether the diagnostic timer has timed out. If so, algorithm execution to advances to step 136, and if not, algorithm execution advances to step 118 where control computer 42 is operable to determine whether all of the data acquisition conditions are satisfied. In one embodiment, control computer 42 is operable to execute step 114 by monitoring the various operating conditions set forth in the following Table 2, and comparing these various operating conditions to corresponding status conditions, parameter thresholds and/or parameter ranges also set forth in Table 2. If all of these enabling conditions are satisfied, algorithm execution advances to step 120, and otherwise it loops back to step 114. Steps 114–118 thus allow data acquisition by the EGR flow rate diagnostic portion of algorithm 100 only when all of the data acquisition conditions monitored at step 114 are satisfied. If the diagnostic timer times out while waiting for the data acquisition conditions to be satisfied, control computer 42 leaves the data acquisition portion of algorithm 100 and advances to step 136.

TABLE 2

| Engine/System Operating Condition | Enabling Threshold, Range or Condition |
|---|---|
| All system sensors | no supply voltage out-of-range fault |
| Intake manifold pressure sensor | no in-range or out-of-range faults |
| Intake manifold temperature sensor | no out-of-range or rationality faults |
| Exhaust pressure sensor | no out-of-range faults |
| Ambient air temperature sensor | no out-of-range faults |
| Ambient air pressure sensor | no out-of-range faults |
| ΔP sensor | no out-of-range or rationality faults |
| EGR orifice temperature sensor | no out-of-range or rationality faults |
| EGR valve position sensor | no in-range, out-of-range or rationality faults |
| Coolant temperature sensor | no in-range or out-of-range faults |
| EGR valve and VGT mechanism actuator drive and control circuits | no EGR/VGT control functionality or drive circuit faults |
| Power Take Off Status | Inactive |
| Engine operating state | Run |
| Battery voltage (BV) | $BV_L < BV < BV_H$ |
| Ambient air pressure (AP) | $AP > AP_{TH}$ |
| Ambient air temperature (AT) | $AT_L < AT < AT_H$ |

In Table 2, the first ten conditions relate to in-range, out-of-range and/or rationality faults, all of which are conventional sensor fault conditions that are commonly understood by those skilled in the art. In one embodiment, control computer 42 includes sensor monitoring circuitry and/or software (not shown) for monitoring such sensor fault conditions, and in this embodiment the corresponding in-range, out-of-range and rationality fault information forms part of the internally generated sensor and driver circuit diagnostic information provided to the EGR flow rate diagnostic block 98 as illustrated in FIG. 2. Alternatively, the EGR flow rate diagnostic block 98 may include lo sensor diagnostic software, and in this embodiment the signals produced by all of the sensors in system 10 are provided to block 98 via conventional sensor inputs.

The EGR/VGT control functionality or drive circuit faults relate to the operation and control of the EGR valve 36 and any VGT control mechanism(s) 75 described hereinabove, and in one embodiment control computer 42 includes circuitry and/or is software (not shown) for monitoring such EGR valve and VGT control mechanism fault conditions, and in this embodiment the corresponding EGR/VGT control functionality or drive circuit fault information forms part of the internally generated sensor and driver circuit diagnostic information provided to the EGR flow rate diagnostic logic block 98 as illustrated in FIG. 2. Alternatively, the EGR flow rate diagnostic block 98 may include EGR/VGT control mechanism diagnostic software, and in this embodiment signals provided by EGR/VGT control mechanism diagnostic sensors or other fault detection circuitry are provided to block 98 via conventional sensor inputs.

System 10 may further include conventional power take off (PTO) system (not shown) that may be used to operate the engine at one or more specified engine speeds and/or to operate conventional PTO machinery. In one embodiment, control computer 42 includes circuitry and/or software (not shown) for monitoring the operational status of the PTO system, and in this embodiment the PTO status information forms part of the internally generated engine operating information provided to the EGR flow rate diagnostic logic block 98 as illustrated in FIG. 2. Alternatively, the EGR flow rate diagnostic logic block 98 may include PTO system monitoring software, and in this embodiment signals produced by PTO operational switches or other PTO control devices are provided to block 98 via conventional sensor inputs.

The control computer 42 maintains a flag or other indicator of the operating state of the engine in a conventional manner, wherein the status of such a flag or other indicator reflects the operational state; i.e., "run" or "stop", of the engine 12. In one embodiment, control computer 42 includes circuitry and/or software for monitoring the operational state of the engine 12, and in this embodiment the engine operating state flag or other indicator forms part of the internally generated engine operating information provided to the EGR flow rate diagnostic logic block 98 as illustrated in FIG. 2. Alternatively, the EGR flow rate diagnostic logic block 98 may include engine operating state monitoring software, and in this embodiment signals produced by sensors or switches from which the engine operating state may determined are provided to block 98 via conventional sensor inputs.

The remaining data acquisition conditions set forth in Table 2 represent specified operating ranges of certain engine and/or system operating parameters. For example, the voltage, BV, produced by the vehicle battery (not shown) must be in a range between a low battery voltage, $BV_L$, and a high battery voltage, $BV_H$. In one embodiment, $BV_L$ and $BV_H$ are set at voltage levels representing extremes at which the control computer 42 is designed to operate, although it is contemplated that $BV_L$ and $BV_H$ may alternatively be set at other desired battery voltage levels. As another example, the ambient air pressure, AP, must be greater than an ambient air pressure threshold, $AP_{TH}$. In one embodiment, $AP_{TH}$ is set at a pressure indicative of an altitude sufficiently above sea-level that allows for normal EGR flow rate operation, although it is contemplated that $AP_{TH}$ may be set at other desired pressure levels. As a further example, the ambient temperature, AT, must be in a range between a low ambient temperature, $AT_L$, and a high ambient temperature, $AT_H$. In one embodiment, $AT_L$ and $AT_H$ define an ambient temperature range in which the results of the EGR flow rate diagnostic may be considered reliable, although it is contemplated that $AT_L$ and $AT_H$ may alternatively be set at other desired ambient temperature levels. In each of these cases, the engine and/or system operating information is provided to block 98 via the sensor inputs illustrated in FIG. 2.

Those skilled in the art will recognize that Table 2 represents only one illustrative collection of data acquisition conditions, and that this collection may alternatively exclude some of the listed conditions and/or include other engine and/or system operating condition that are not illustrated in Table 2. Any such alternate collection of enabling conditions will typically be dictated by the application and/or desired accuracy of the diagnostic algorithm, and is in any case intended to fall within the scope of the claims appended hereto.

Referring again to FIG. 3A, if control computer 42 determines at step 118 that all of the data acquisition conditions have been satisfied, algorithm execution advances to step 120 where control computer 42 is operable to determine the current EGR fraction, $EGR_F$, using any of the techniques described hereinabove. Thereafter at step 122, control computer 42 is operable to determine the commanded EGR fraction, $CEGR_F$, produced by logic block 96, and thereafter at step 124 control computer 42 is operable to compute an EGR fraction error, EGRFE, as a difference between the EGR fraction, $EGR_F$, and the commanded EGR fraction, $CEGR_F$; i.e., $EGRFE=EGR_F-CEGR_F$. Thereafter at step 126, control computer 42 is operable to update the positive and negative EGR fraction error sums, EGRPS and EGRNS respectively. In one embodiment, control computer 42 is operable to update the positive and negative EGR fraction error sums according to the equations EGRPS=MAX(0, EGRPS+EGRFE) and EGRNS=MAX(0, EGRNS−EGRFE). In an alternative embodiment, control computer 42 may be configured to compute at step 126 the positive and negative EGR fraction error sums according to other known error summation techniques. In another alternative embodiment, control computer 42 may be configured at step 126 to accumulate only positive EGR fraction error sums, EGRPS, or only negative EGR fraction error sums, EGRNS. In yet another alternative embodiment, control computer 42 may be configured at step 126 to track and accumulate both positive and negative EGR fraction errors using only a single EGR fraction error sum parameter. Any such alternative EGR fraction error sum accumulation strategy is intended to fall within the scope of the claims appended hereto, and any required modifications to algorithm 100 for effectuating any such alternative strategy would be a mechanical step to a skilled artisan.

Following step 126, control computer 42 is operable at step 128 to compare the positive and negative EGR fraction error sums to predefined threshold values TH1 and TH2 respectively, wherein TH1 and TH2 are calibratible threshold values. If, at step Is 124, control computer 42 determines that EGRPS meets or exceeds TH1 or that EGRNS meets or exceeds TH2, algorithm execution advances to step 130 where control computer 42 is operable to set the EGR flow rate diagnostic flag to FAIL, and thereafter to step 132 where control computer 42 returns algorithm 100 to its calling routine. If, on the other hand, control computer 42 determines at step 128 that EGRPS is less than TH1 and EGRNS is less than TH2, algorithm execution advances to step 134 where control computer 42 is operable to determine whether the diagnostic timer has timed out. In one embodiment, the diagnostic timer is configured such that the EGR flow rate diagnostic period defined by the diagnostic loop of steps 110–134 of algorithm 100 runs for approximately 200 seconds, although other diagnostic timer configurations, and hence other EGR flow rate diagnostic period durations, are contemplated. In any case, if control computer 42 determines at step 134 that the diagnostic counter has not timed out, algorithm execution loops back to step 110. If, on the other hand, control computer 42 determines at step 134 that the diagnostic counter has timed out, this signals the end of the diagnostic period defined by the diagnostic loop of steps 110–134 and algorithm execution advances to step 136.

At step 136, control computer 42 is operable to compare the positive and negative EGR fraction error sums to predefined threshold values TH3 and TH4 respectively. In one embodiment, TH1>Th3 and TH2>TH4, although other values of TH3 and TH4 are contemplated. In any case, if control computer 42 determines at step 136 that EGRPS is less than TH3 and EGRNS is less than TH4, algorithm execution advances to step 138 where control computer 42 is operable to set the EGR flow rate diagnostic flag to PASS, and thereafter to step 142 where control computer 42 returns algorithm 100 to its calling routine. If, on the other hand, control computer 42 determines at step 136 that EGRPS is greater than or equal to TH3 or EGRNS is greater than or equal to TH4, algorithm execution advances to step 140 where control computer 42 is operable to set the EGR flow rate diagnostic flag to ABORT, and thereafter to step 142 where control computer 42 returns algorithm 100 to its calling routine.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. System for diagnosing exhaust gas recirculation (EGR) flow rate operation in an internal combustion engine, comprising:
   intake and exhaust manifolds each operatively coupled to the engine;
   an EGR conduit for recirculating exhaust gas from the exhaust manifold to the intake manifold;
   means for determining an EGR fraction corresponding to a fractional amount of recirculated exhaust gas in a total air charge supplied to the intake manifold; and
   a control computer continually accumulating at least one EGR fraction error sum as a function of the EGR fraction and a desired EGR fraction, and diagnosing EGR flow rate operation as a function of the accumulated value of the at least one EGR fraction error sum.

2. The system of claim 1 wherein the control computer is configured to diagnose the EGR flow rate operation as normal if the accumulated value of the at least one EGR fraction error sum is less than a threshold value upon expiration of a diagnostic period.

3. The system of claim 2 further including a memory having an EGR flow rate diagnostic flag stored therein, the control computer configured to set the EGR flow rate diagnostic flag to PASS upon diagnosing the EGR flow rate operation as normal.

4. The system of claim 1 wherein the control computer is configured to diagnose the EGR flow rate operation as failing if the accumulated value of the at least one EGR fraction error sum meets or exceeds a threshold value during a diagnostic period.

5. The system of claim 4 further including a memory having an EGR flow rate diagnostic flag stored therein, the control computer configured to set the EGR flow rate diagnostic flag to FAIL upon diagnosing the EGR flow rate operation as failing.

6. The system of claim 1 further including a memory having an EGR flow rate diagnostic flag stored therein;
   wherein the control computer is configured to set the EGR flow rate diagnostic flag to ABORT if the accumulated value of the at least one EGR fraction error sum meets or exceeds a threshold value upon expiration of a diagnostic period.

7. The system of claim 1 wherein the control computer is configured to continually compute for a diagnostic period an EGR fraction error as a difference between the EGR fraction and the desired EGR fraction, a positive EGR fraction error sum as a maximum of zero and a sum of a previous value of the positive EGR fraction error sum and the EGR fraction error, and a negative EGR fraction error sum as a maximum of zero and a sum of a previous value of the negative EGR fraction error sum and the EGR fraction error.

8. The system of claim 7 wherein the control computer is configured to diagnose the EGR flow rate operation as normal if an accumulated value of the positive EGR fraction error sum remains less than a first threshold value throughout the diagnostic period and an accumulated value of the negative EGR fraction error sum remains less than a second threshold value throughout the diagnostic period, and if the accumulated value of the positive EGR fraction error sum is less than a third threshold value, less than the first threshold value, and the accumulated value of the negative EGR fraction error sum is less than a fourth threshold value, less than the second threshold value, upon expiration of the diagnostic period.

9. The system of claim 8 further including a memory having an EGR flow rate diagnostic flag stored therein, the control computer configured to set the EGR flow rate diagnostic flag to PASS upon diagnosing the EGR flow rate operation as normal.

10. The system of claim 7 wherein the control computer is configured to diagnose the EGR flow rate operation as failing if either of an accumulated value of the positive EGR fraction error sum meets or exceeds a first threshold value during the diagnostic period and an accumulated value of the negative EGR fraction error sum meets or exceeds a second threshold value during the diagnostic period.

11. The system of claim 10 further including a memory having an EGR flow rate diagnostic flag stored therein, the control computer configured to set the EGR flow rate diagnostic flag to FAIL upon diagnosing the EGR flow rate operation as failing.

12. The system of claim 7 further including a memory having an EGR flow rate diagnostic flag stored therein;
wherein the control computer is configured to set the EGR flow rate diagnostic flag to ABORT if an accumulated value of the positive EGR fraction error sum remains below a first threshold value, and an accumulated value of the negative EGR fraction error sum remains below a second threshold value, throughout the diagnostic period, and upon expiration of the diagnostic period either of the accumulated value of the positive EGR fraction error sum meets or exceeds a third threshold value less than the first threshold value, and the accumulated value of the negative EGR fraction error sum meets or exceeds a fourth threshold value less than the second threshold value.

13. The system of claim 1 wherein the control computer is configured to monitor a number of diagnostic enable conditions prior to starting a diagnostic period in which the at least one EGR fraction error sum is continually accumulated, and to start the diagnostic period only if all of the number of diagnostic enable conditions are met.

14. The system of claim 13 wherein the control computer is further configured to monitor the number of diagnostic enable conditions throughout the diagnostic period, and to restart the diagnostic period if any of the number of diagnostic enable conditions is no longer met.

15. The system of claim 14 further including means for determining rotational speed of the engine;
wherein one of the number of diagnostic enable conditions corresponds to the rotational speed of the engine being within a predefined range of engine rotational speeds.

16. The system of claim 14 wherein the control computer is configured to determine an engine load value as a function of an engine fueling command;
wherein one of the number of diagnostic enable conditions corresponds to the engine load value being less than a threshold engine load value.

17. The system of claim 14 further including:
an EGR valve disposed in-line with the EGR conduit, the EGR valve responsive to an EGR valve control command to control a position of the EGR valve relative to a reference position; and
means for determining the position of the EGR valve relative to the reference position;
wherein one of the number of the diagnostic enable conditions corresponds to the position of the EGR valve being greater than a threshold EGR valve position.

18. The system of claim 7 wherein the control computer is configured to continually monitor during the diagnostic period a number of data acquisition conditions, and to compute the EGR fraction error, the positive EGR fraction error sum, and the negative EGR fraction error sum only if all of the number of diagnostic acquisition conditions are met.

19. A method for diagnosing exhaust gas recirculation (EGR) flow rate operation in an internal combustion engine having an intake manifold, an exhaust manifold and an EGR conduit for recirculating exhaust gas from the exhaust manifold to the intake manifold, the method comprising the steps of:
determining an EGR fraction corresponding to a fractional amount of recirculated exhaust gas in a total air charge supplied to the intake manifold;
determining a desired EGR fraction;
continually computing an EGR fraction error as a difference between the EGR fraction and the desired EGR fraction and accumulating at least one EGR fraction error sum as a function of the EGR fraction error; and
diagnosing EGR flow rate operation as a function of the accumulated value of the at least one EGR fraction error sum.

20. The method of claim 19 wherein the step of diagnosing EGR flow rate operation includes diagnosing the EGR flow rate operation as normal if the accumulated value of the at least one EGR fraction error sum is less than a threshold value upon expiration of a diagnostic period.

21. The method of claim 20 further including the step of setting an EGR flow rate diagnostic flag stored in memory to PASS upon diagnosing the EGR flow rate operation as normal.

22. The method of claim 19 wherein the step of diagnosing EGR flow rate operation includes diagnosing the EGR flow rate operation as failing if the accumulated value of the at least one EGR fraction error sum meets or exceeds a threshold value during a diagnostic period.

23. The method of claim 22 further including the step of setting an EGR flow rate diagnostic flag stored in memory to FAIL upon diagnosing the EGR flow rate operation as failing.

24. The method of claim 19 wherein the step of diagnosing EGR flow rate operation includes setting an EGR flow rate diagnostic flag stored in memory to ABORT if the accumulated value of the at least one EGR fraction error sum meets or exceeds a threshold value upon expiration of the diagnostic period.

25. The method of claim 19 further including the steps of:
monitoring a number of diagnostic enable conditions;
and executing the continually computing and diagnosing steps only if all of the number of diagnostic enable conditions are met.

26. The method of claim 25 further including the steps of:
monitoring the number of diagnostic enable conditions throughout a diagnostic period in which the EGR fraction error is continually computed; and
restarting the diagnostic period if any of the number of diagnostic enable conditions is no longer met.

27. The method of claim 26 further including the steps of:
determining rotational speed of the engine; and
determining that one of the number of diagnostic enable conditions is met if the rotational speed of the engine is within a predefined range of engine rotational speeds.

28. The method of claim 26 further including the steps of:
  determining an engine load value as a function of an engine fueling command; and
  determining that one of the number of diagnostic enable conditions is met if the engine load value is less than a threshold engine load value.

29. The system of claim 26 further including the steps of:
  determining relative to a reference position a position of an EGR valve disposed in-line with the EGR conduit; and
  determining that one of the number of the diagnostic enable conditions is met if the position of the EGR valve is greater than a threshold EGR valve position.

30. The method of claim 19 wherein the step of continually computing an EGR fraction error as a difference between the EGR fraction and the desired EGR fraction and accumulating at least one EGR fraction error sum as a function of the EGR fraction error further includes:
  monitoring a number of data acquisition conditions; and
  and computing the EGR fraction error and accumulating the at least one EGR fraction sum error only if all of the number of data acquisition conditions are met.

31. A method for diagnosing exhaust gas recirculation (EGR) flow rate operation in an internal combustion engine having an intake manifold, an exhaust manifold and an EGR conduit for recirculating exhaust gas from the exhaust manifold to the intake manifold, the method comprising the steps of:
  determining an EGR fraction corresponding to a fractional amount of recirculated exhaust gas in a total air charge supplied to the intake manifold;
  determining a desired EGR fraction;
  continually computing an EGR fraction error as a difference between the EGR fraction and the desired EGR fraction, a positive EGR fraction error sum as a maximum of zero and a sum of a previous value of the positive EGR fraction error sum and the EGR fraction error, and a negative EGR fraction error sum as a maximum of zero and a is sum of a previous value of the negative EGR fraction error sum and the EGR fraction; and
  diagnosing EGR flow rate operation as a function of accumulated values of the positive EGR fraction error sum and the negative EGR fraction error sum.

32. The method of claim 31 wherein the step of diagnosing EGR flow rate operation includes diagnosing the EGR flow rate operation as normal if the accumulated value of the positive EGR fraction error sum remains less than a first threshold value, and an accumulated value of the negative EGR fraction error sum remains less than a second threshold value, throughout a diagnostic period, and if the accumulated value of the positive EGR fraction error sum is less than a third threshold value, less than the first threshold value, and the accumulated value of the negative EGR fraction error sum is less than a fourth threshold value, less than the second threshold value, upon expiration of the diagnostic period.

33. The method of claim 32 further including the step of setting an EGR flow rate diagnostic flag stored in memory to PASS upon diagnosing the EGR flow rate operation as normal.

34. The method of claim 31 wherein the step of diagnosing EGR flow rate operation includes diagnosing the EGR flow rate operation as failing if during a diagnostic period either of an accumulated value of the positive EGR fraction error sum meets or exceeds a first threshold value and an accumulated value of the negative EGR fraction error sum meets or exceeds a second threshold value.

35. The method of claim 34 further including the step of setting an EGR flow rate diagnostic flag stored in memory to FAIL upon diagnosing the EGR flow rate operation as failing.

36. The method of claim 34 wherein the step of diagnosing EGR flow rate operation includes setting an EGR flow rate diagnostic flag stored in memory to ABORT if an accumulated value of the positive EGR fraction error sum remains below a first threshold value, and an accumulated value of the negative EGR fraction error sum remains below a second threshold value, during a diagnostic period, and if upon expiration of the diagnostic period either of the accumulated value of the positive EGR fraction error sum meets or exceeds a third threshold value less than the first threshold value and an accumulated value of the negative EGR fraction error sum meets or exceeds a fourth threshold value less than the second threshold value.

37. The method of claim 31 further including the steps of:
  monitoring a number of diagnostic enable conditions; and
  executing the continually computing and diagnosing steps only if all of the number of diagnostic enable conditions are met.

38. The method of claim 37 further including the steps of:
  monitoring the number of diagnostic enable conditions throughout the diagnostic period; and
  restarting the diagnostic period if any of the number of diagnostic enable conditions is no longer met.

39. The method of claim 38 further including the steps of:
  determining rotational speed of the engine; and
  determining that one of the number of diagnostic enable conditions is met if the rotational speed of the engine is within a predefined range of engine rotational speeds.

40. The method of claim 38 further including the steps of:
  determining an engine load value as a function of an engine fueling command; and
  determining that one of the number of diagnostic enable conditions is met if the engine load value is less than a threshold engine load value.

41. The system of claim 38 further including the steps of:
  determining relative to a reference position a position of an EGR valve disposed in-line with the EGR conduit; and
  determining that one of the number of the diagnostic enable conditions is met if the position of the EGR valve is greater than a threshold EGR valve position.

42. The method of claim 31 wherein the step of continually computing an EGR fraction error, the positive EGR fraction error sum, and the negative EGR fraction error sum further includes:
  monitoring a number of data acquisition conditions; and
  and computing the EGR fraction error, the positive EGR fraction error sum, and the negative EGR fraction error sum only if all of the number of data acquisition conditions are met.

* * * * *